US008773705B2

(12) United States Patent
Park (10) Patent No.: US 8,773,705 B2
(45) Date of Patent: Jul. 8, 2014

(54) DATA TRANSMITTING METHOD OF IMAGE FORMING APPARATUS AND IMAGE FORMING APPARATUS FOR PERFORMING DATA TRANSMITTING METHOD

(75) Inventor: Hyun-wook Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1044 days.

(21) Appl. No.: 12/431,173

(22) Filed: Apr. 28, 2009

(65) Prior Publication Data

US 2010/0073730 A1    Mar. 25, 2010

(30) Foreign Application Priority Data

Sep. 24, 2008  (KR) .................................. 2008-93868

(51) Int. Cl.
G06K 15/00  (2006.01)
G06F 3/12  (2006.01)
H04N 1/00  (2006.01)

(52) U.S. Cl.
USPC .......................... 358/1.16; 358/1.13; 358/402

(58) Field of Classification Search
USPC ......... 358/440, 437, 438, 442, 444, 405, 402, 358/434
See application file for complete search history.

(56) References Cited

U.S. PATENT DOCUMENTS

| | | | | |
|---|---|---|---|---|
| 5,970,121 | A * | 10/1999 | Homayoun | 379/28 |
| 6,775,691 | B1 * | 8/2004 | Kubik et al. | 709/206 |
| RE42,702 | E * | 9/2011 | Cobb | 709/206 |
| 8,184,316 | B2 * | 5/2012 | Bouchard | 358/1.15 |
| 8,184,346 | B2 * | 5/2012 | Ozawa et al. | 358/468 |
| 8,255,784 | B2 * | 8/2012 | Masui | 715/200 |
| 2004/0054741 | A1 * | 3/2004 | Weatherby et al. | 709/206 |
| 2004/0075872 | A1 * | 4/2004 | Adler et al. | 358/442 |
| 2004/0199763 | A1 * | 10/2004 | Freund | 713/154 |
| 2004/0252338 | A1 * | 12/2004 | Oomori | 358/1.15 |
| 2005/0007624 | A1 * | 1/2005 | Henry | 358/1.15 |
| 2005/0021980 | A1 | 1/2005 | Kanai | |
| 2006/0082822 | A1 * | 4/2006 | Irons et al. | 358/1.15 |
| 2006/0168075 | A1 * | 7/2006 | Kitada et al. | 709/206 |
| 2007/0086023 | A1 * | 4/2007 | Kadota | 358/1.1 |
| 2007/0223054 | A1 * | 9/2007 | Endo | 358/440 |
| 2007/0247670 | A1 * | 10/2007 | Tomita et al. | 358/440 |
| 2008/0007793 | A1 * | 1/2008 | Filbrich et al. | 358/440 |
| 2008/0024833 | A1 * | 1/2008 | Kawasaki | 358/468 |

(Continued)

FOREIGN PATENT DOCUMENTS

KR       2005-038372       2/2005

OTHER PUBLICATIONS

Korean Office Action for related Korean Patent Application No. 10-2008-0093868, mailed on Oct. 10, 2012.
Korean Office Action dated Feb. 15, 2013 in Korean Patent Application No. 10-2008-0093868.

(Continued)

*Primary Examiner* — Madelein A Nguyen
(74) *Attorney, Agent, or Firm* — Staas & Halsey LLP (57) ABSTRACT

A method of transmitting data from an image forming apparatus, the method including: receiving identification information of a destination of the data; determining whether to transmit the data to the destination corresponding to the received identification information based on a security policy of the image forming apparatus; and transmitting the data to the destination in response to the destination being determined to be a destination to where the data is allowed to be transmitted, based on the security policy.

17 Claims, 8 Drawing Sheets

(56) References Cited

U.S. PATENT DOCUMENTS

| | | |
|---|---|---|
| 2008/0062467 A1* | 3/2008 | Rajput .................... 358/3.03 |
| 2009/0086278 A1* | 4/2009 | Vendrow et al. ............. 358/402 |
| 2010/0208723 A1* | 8/2010 | Olafsson .................. 370/352 |
| 2012/0182578 A1* | 7/2012 | Endo ....................... 358/1.15 |
| 2012/0287471 A1* | 11/2012 | Street, Jr. ................ 358/1.15 |

OTHER PUBLICATIONS

Korean Office Action issued Dec. 19, 2013 in Korean Patent Application No. 10-2013-0042430.

* cited by examiner

FIG. 3

STORE FTP Server ADDRESS LIST

Server IP Address and port : [ 10.90.194.55 ] [ 21 ] — 300

Login Name : [ aa ] — 310

Login password : [ ******** ] — 320

[ Apply ]

FIG. 4

Warning: THE SERVER IS A TRANSMISSION BLOCK SERVER AND CANNOT BE STORED IN ADDRESS LIST. CONTACT PERSON IN CHARGE. — 400

CAUSE: SERVER VIOLATED IN-HOUSE SECURITY POLICY — 410

TRANSMISSION-POSSIBLE MODE  ☑ Enable

620
- Server 1 : IP address — 10.88.194.55
  - Description — SECURITY-AUTHORIZED FTP server OF MARKETING GROUP
- Server 2 : IP address — 10.88.195.56
  - Description — SECURTIY-AUTHORIZED SMB server OF DEVELOPMENT GROUP
- Server 3 : IP address — 10.88.196.57
  - Description —
- Server IP address ranges — 10.88.193.1 ~ 10.88.193.255
  - Descripton — PC, Server OF MARKETING GROUP IS ALLOWED
- Server IP address ranges — 10.88.192.1 ~ 10.88.192.255
  - Descripton — PC, Server OF DEVELOPMENT GROUP IS ALLOWED

610

TRANSMISSION-BLOCK MODE  ☐ Enable

630
- Server 1 : IP address — 10.90.194.55
  - Description — SERVER THAT VIOLATED IN-HOUSE SECURITY POLICY
- Server 2 : IP address — 10.90.195.56
  - Description — SERVER WHOSE USER IS NOT IDENTIFIED
- Server 3 : IP address — 10.90.196.57
  - Description —
- Server IP address ranges — 10.90.193.1 ~ 10.90.193.255
  - Description — PC, Server OF SALES TEAM CANNOT BE USED
- Server IP address ranges — 10.90.192.1 ~ 10.90.192.255
  - Description — PC, Server OF PERSONNEL TEAM CANNOT BE USED

FIG. 9

DATA TRANSMITTING METHOD OF IMAGE FORMING APPARATUS AND IMAGE FORMING APPARATUS FOR PERFORMING DATA TRANSMITTING METHOD

CROSS-REFERENCE TO RELATED APPLICATION

This application claims the benefit of Korean Patent Application No. 2008-93868, filed Sep. 24, 2008, in the Korean Intellectual Property Office, the disclosure of which is incorporated herein by reference.

BACKGROUND OF THE INVENTION

1. Field of the Invention

Aspects of the present general inventive concept relate to a method of transmitting data of an image forming apparatus and an image forming apparatus performing the data transmitting method.

2. Description of the Related Art

In general, an image forming apparatus is a device that performs operations of printing, copying, scanning, and/or faxing. Since such multiple operations are provided in an image forming apparatus due to the latest technology developments, the user can individually conduct printing, copying, faxing, scanning, etc., operations using the image forming apparatus, and then conduct various other operations according to user requirements (such as transmitting generated scan data of a scanning operation via e-mail or fax).

Recently, a network scan method that transmits an image file that is scanned by an image forming apparatus to a destination via a network has been frequently used. Examples of the currently used network scan method include: a Scan to File Transfer Protocol (FTP) method, in which a scanned image file is transmitted to an FTP server; a Scan to Server Message Block (SMB) method, in which a scanned image file is transmitted to a common folder of a PC; a Scan to e-mail method, in which a scanned image file is attached to an e-mail to be transmitted; and a Scan to Web-based Distributed Authoring and Versioning (WebDAV) method, in which a scanned image file is transmitted to a WebDAV server. When the network scan method is used, the image file scanned by the image forming apparatus can be easily transmitted to a destination via a network. However, since there is no restriction to the type of data transmission, documents that require security (such as confidential papers) might be easily leaked.

SUMMARY OF THE INVENTION

Aspects of the present general inventive concept provide a data transmission method of an image forming apparatus, in which a scanned image file is transmitted via a network and leakage of the transmitted data to the outside can be prevented during the transmission, and an image forming apparatus performing the method.

According to an aspect of the present general inventive concept, there is provided a method of transmitting data from an image forming apparatus, the method including: receiving identification information of a destination of the data; determining whether to transmit the data to the destination corresponding to the received identification information based on a security policy of the image forming apparatus; and transmitting the data to the destination in response to the destination being determined to be a destination to where the data is allowed to be transmitted based on the security policy.

According to another aspect of the present general inventive concept, there is provided a computer-readable recording medium having embodied thereon a program for executing the method of transmitting data of an image forming apparatus, on at least one computer.

According to another aspect of the present general inventive concept, there is provided an image forming apparatus to transmit data, the apparatus including: a first user interface unit to receive identification information of a destination of the data; a transmission possibility determining unit to determine whether the data is allowed be transmitted to the destination corresponding to the identification information received through the first user interface unit based on a security policy of the image forming apparatus; and a data transmission unit to transmit data if the transmission possibility determining unit determines the destination as a destination to where the data is allowed to be transmitted.

According to yet another aspect of the present invention, there is provided a method of implementing a security policy in an image forming apparatus, the method including: receiving one or more identification information of corresponding devices connected to the image forming apparatus; determining, for each of the one or more identification information, if the corresponding device is a destination to where data is allowed to be transmitted based on a security policy of the image forming apparatus; storing the corresponding identification information in an address list database, in the image forming apparatus, if the device is determined to be the destination to where the data is allowed to be transmitted.

According to still another aspect of the present invention, there is provided a method of transmitting data from an image forming apparatus, the method including: receiving a selection of identification information of a destination of the data, the identification information being selected from an address list database that stores one or more identification information of corresponding destinations to where data is allowed to be transmitted based on a security policy of the image forming apparatus; and transmitting the data to the destination.

According to another aspect of the present invention there is provided an image forming apparatus to implement a security policy, the apparatus including: a first user interface unit to receive one or more identification information of corresponding devices connected to the image forming apparatus; and an address list managing unit to determine, for each of the one or more identification information, if the corresponding device is a destination to where data is allowed to be transmitted based on a security policy of the image forming apparatus, and to store the corresponding identification information in an address list database if the device is determined to be the destination to where the data is allowed to be transmitted.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
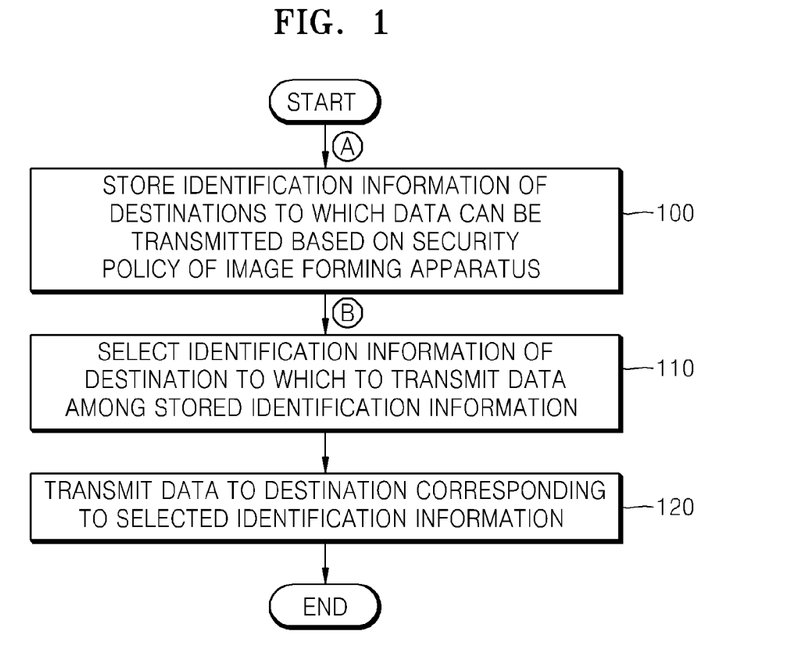
FIG. 1 is a flowchart illustrating a data transmission method of an image forming apparatus according to an embodiment of the present general inventive concept.

FIG. 1 is a flowchart illustrating a data transmission method of an image forming apparatus according to an embodiment of the present general inventive concept. Referring to FIG. 1, identification information of destinations to where data can be transmitted is stored based on a security policy of an image forming apparatus in operation 100.

Figure 2:
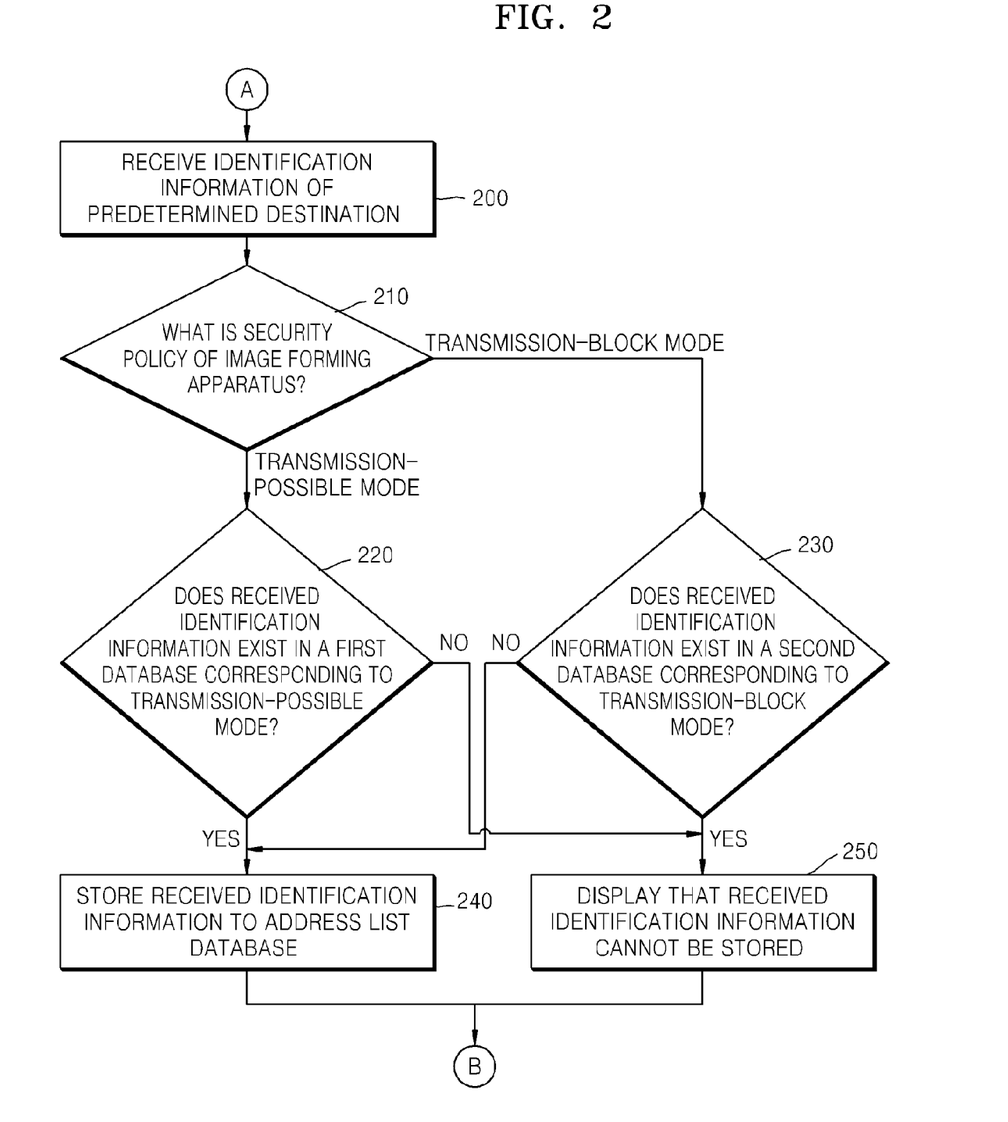
FIG. 2 is a detailed flowchart of an operation of storing destination identification information, of the method illustrated in FIG. 1.

FIG. 2 is a detailed flowchart of operation 100 of the method illustrated in FIG. 1. Hereinafter, the operation 100 of FIG. 1 will be described in detail with reference to FIG. 2. Referring to FIG. 2, identification information of a destination is received in operation 200. The identification information may be received through a user interface that receives user inputs of identification information of a destination. Here, a destination may be a host or a device that is connected to the image forming apparatus via a network. Examples of the host include a host PC, a management server, a storage server, etc. Moreover, the host may be a File Transfer Protocol (FTP server), a Web-based Distributed Authoring and Versioning (WebDAV) server, and/or a Simple Mail Transfer Protocol (SMTP) server. The device may be another image forming apparatus. Also, the identification information of the destination may be an Internet Protocol (IP) address of a server that is connected to the image forming apparatus via a network or the name of a device. That is, if the destination is a server, the IP address of the server may be received as the identification information, and if the destination is a device, the name of the device may be received as the identification information.

Figure 3:
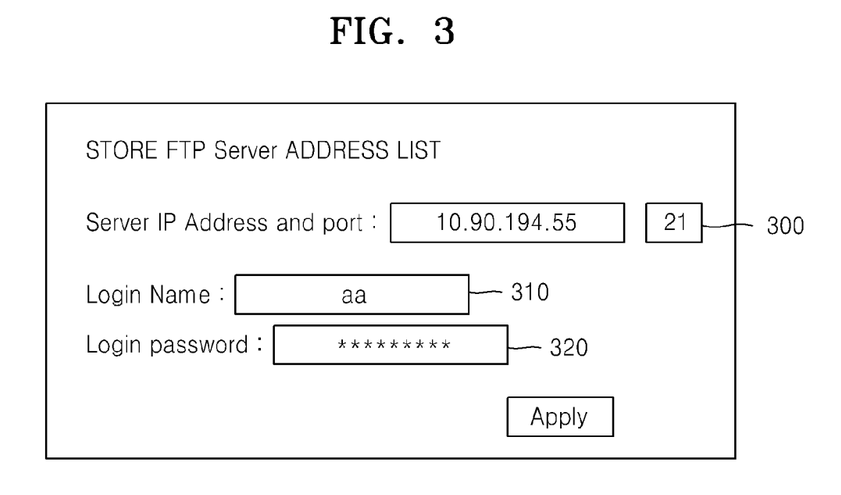
FIG. 3 illustrates a user interface that receives identification information of a predetermined destination according to an embodiment of the present general inventive concept.

FIG. 3 illustrates a user interface that receives the identification information of a predetermined destination according to an embodiment of the present general inventive concept.

The user interface illustrated in FIG. 3 is for a case in which the destination is an FTP server. As illustrated in FIG. 3, by receiving an IP address and information about a port 300 of the FTP server, and a login name 310 and a login password 320 for logging into the FTP server, the IP address of the FTP server (i.e., the destination) is received.

Referring back to FIG. 2, the security policy of the image forming apparatus is checked in operation 210. A security policy is used when transmitting data in the image forming apparatus according to aspects of the present general inventive concept. The security policy may include a transmission-possible mode, in which destinations to which data can be transmitted are designated, and/or a transmission-block mode, in which destinations to which data cannot be transmitted are designated. If the security policy of the image forming apparatus is the transmission-possible mode, the method proceeds to operation 220. Conversely, if the security policy of the image forming apparatus is the transmission-block mode, the method proceeds to operation 230.

Whether the received identification information exists in a first database corresponding to the transmission-possible mode is checked in operation 220. According to an aspect of the present general inventive concept, each of the security policies has a corresponding database such that identification information of destinations to which data can be transmitted is stored in the first database that corresponds to the transmission-possible mode. For example, the IP address of a server to which data can be transmitted, the name of a device, the range of the server IP address, etc. are stored in the first database. If the received identification information exists in the first database (operation 220), the method proceeds to operation 240. Conversely, if the received identification information does not exist in the first database (operation 220), the method proceeds to operation 250.

If the security policy of the image forming apparatus is the transmission-block mode (operation 210), whether the received identification information exists in a second database that corresponds to the transmission-block mode is checked in operation 230. In the second database corresponding to the transmission-block mode, identification information of destinations to which data transmission cannot be transmitted is stored. For example, the IP address of a server to which data cannot be transmitted, the name of a device, the range of the server IP address, etc. are stored in the second database. If the received identification information exists in the second database (operation 230), the method proceeds to operation 250. Conversely, if the received identification information does not exist in the second database (operation 230), the method proceeds to operation 240.

The received identification information is stored in an address list database in operation 240. The address list database, according to an aspect of the present general inventive concept, stores identification information of a destination where a security problem does not occur. When the received identification information exists in a first database that corresponds to the transmission-possible mode (operation 220) and/or does not exist in a second database that corresponds to the transmission-block mode (operation 230), a security problem does not occur when data is transmitted to the destination corresponding to the received identification information via a network. Accordingly, the received identification information is stored in the address list database in operation 240.

In contrast, a message indicating that the received identification information cannot be stored is output (for example, displayed) in operation 250. When the received identification information does not exist in the first database corresponding to the transmission-possible mode (operation 220) and/or exists in the second database corresponding to the transmission-block mode (operation 230), a security problem results when data is transmitted via a network to a destination corresponding to the received identification information. Accordingly, the received identification information is not stored in the address list database and a message is output to inform the user that the received identification information cannot be stored in operation 250.

Figure 4:
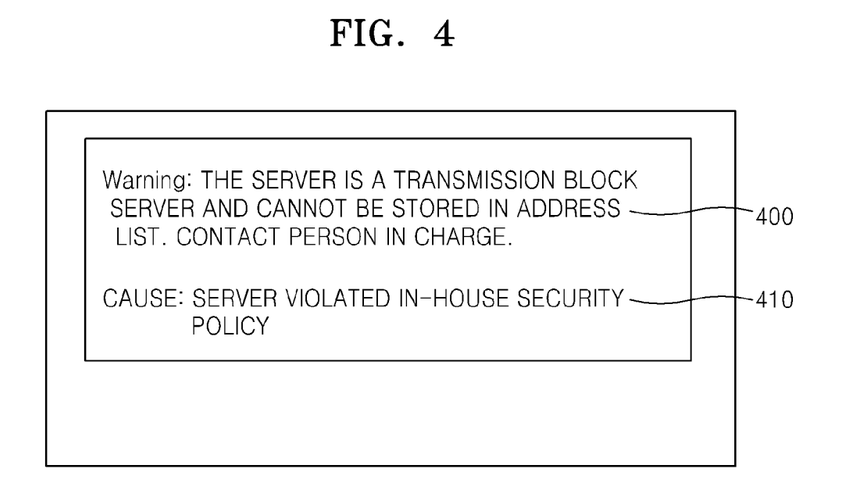
FIG. 4 is a schematic view illustrating a message that is displayed in operation 250 of FIG. 2 according to an embodiment of the present general inventive concept.

FIG. 4 is a schematic view illustrating a message that is displayed in operation 250 of FIG. 2 according to an embodiment of the present general inventive concept. As illustrated in FIG. 4, in operation 250, a message including details 400 that the received identification information cannot be stored and a cause 410 therefore are displayed together. While the present embodiment displays a message that the received identification information cannot be stored, it is understood that aspects of the present general inventive concept are not limited thereto. For example, according to other aspects, a message indicating that data cannot be transmitted may be output, or a light and/or sound may be output to indicate that the identification information cannot be stored.

Referring back to FIG. 1, identification information of a destination to where data is to be transmitted is selected from the stored identification information in operation 110. In the data transmission method of FIG. 1, when data is transmitted to a destination corresponding to identification information stored in an address list database, no security problem results. Accordingly, identification information of a destination to where data is to be transmitted can be selected from among a plurality of identification information of destinations, which may be stored as the IP address, the name of a device, the range of the IP address, etc.

Data is transmitted to the destination corresponding to the selected identification information in operation 120. If the selected identification information is an IP address, data is transmitted to a server corresponding to the IP address. While scan data scanned in the image forming apparatus is described as an example of the data to be transmitted, it is understood that aspects of the present general inventive concept are not limited thereto, and any data stored in the image forming apparatus can be transmitted.

Figure 5:
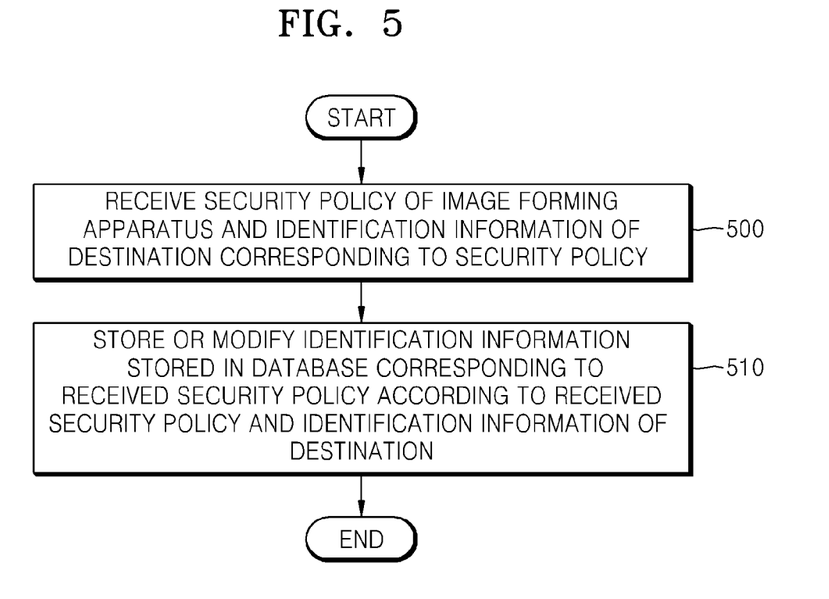
FIG. 5 is a flowchart illustrating a method of receiving a security policy according to an embodiment of the present general inventive concept.

FIG. 5 is a flowchart illustrating a method of receiving a security policy according to an embodiment of the present general inventive concept. The security policy of the image forming apparatus may be received before transmitting data to, or generating data in, the image forming apparatus or when the security policy of the image forming apparatus is modified.

Referring to FIG. 5, the security policy of the image forming apparatus and identification information of a destination corresponding to the security policy are received in operation 500. As described above, since the transmission-possible mode, in which destinations that allow network access are designated, and a transmission-block mode, in which destinations that block network access are designated, are used in the data transmission method of the image forming apparatus according to the current embodiment, the security policy of either the transmission-possible mode or the transmission-block mode is received.

Figure 6:
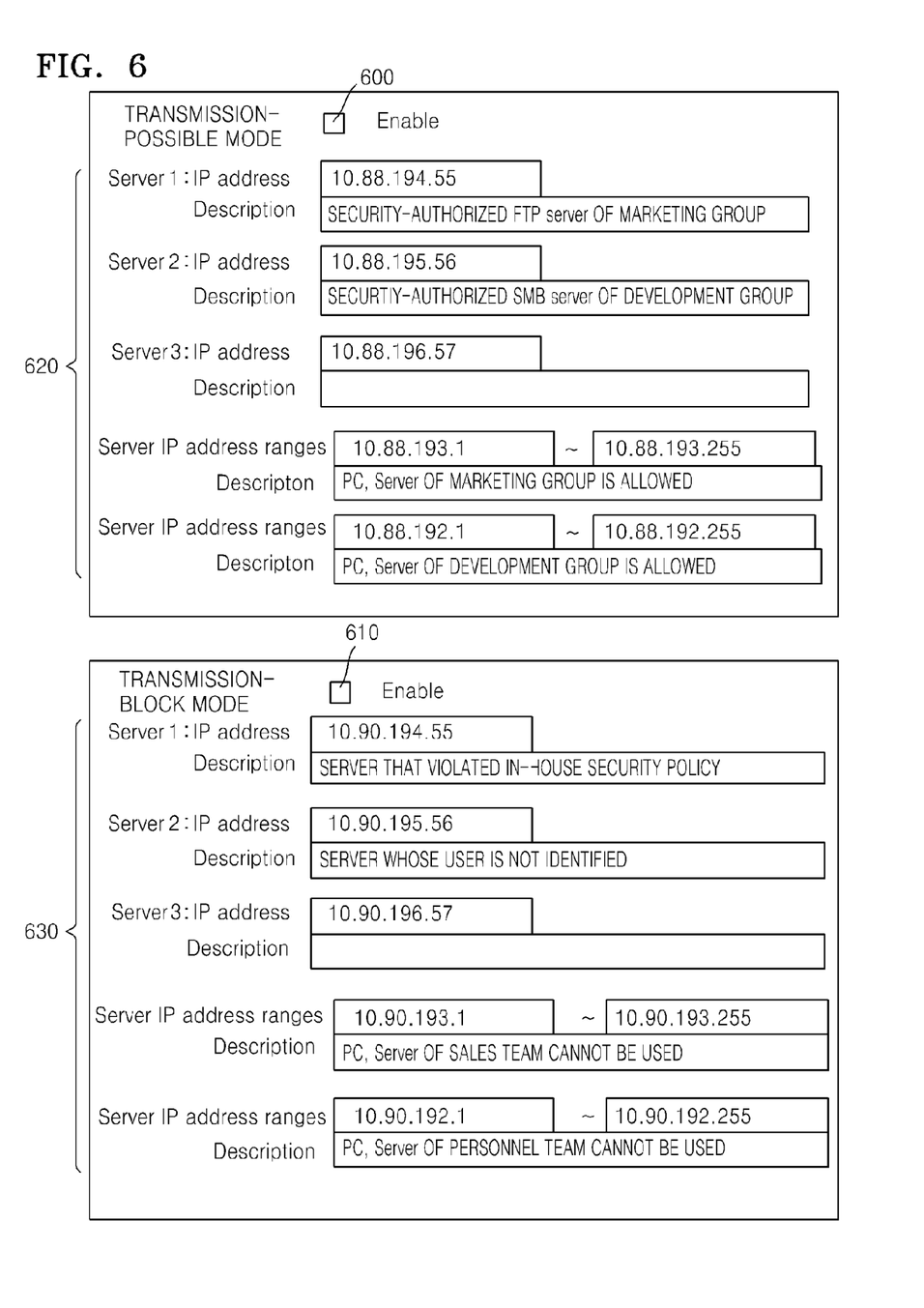
FIG. 6 illustrates a user interface to receive a security policy according to an embodiment of the present general inventive concept.

FIG. 6 illustrates a user interface to receive a security policy according to an embodiment of the present general inventive concept. Referring to FIG. 6, one of a transmission-possible mode 600 and a transmission-block mode 610 is enabled (operation 500 in FIG. 5) in the user interface, and identification information 620 or 630 of a destination according to the security policy is received. The identification information of the destination may be the address of a server and/or the range of the server address Furthermore, an explanation (i.e., description) corresponding to the address of the server or the range of the server address may also be included. Also, the user interface may be realized in a local panel of the image forming apparatus, though aspects of the present general inventive concept are not limited thereto. For example, according to other aspects, the user interface may also (or alternatively) be realized in an embedded web server of the image forming apparatus.

Referring back to FIG. 5, the identification information stored in the database corresponding to the received security policy is stored or modified according to the received security policy and the identification information of the destination in operation 510. For example, when the transmission-possible mode 600 is enabled in the user interface of FIG. 6 and the transmission-possible mode 600 is received as the security policy, the received identification information 620 is stored in a first database corresponding to the transmission-possible mode. If identification information is already stored in the first database and the stored identification information is not identical to the received identification information, the stored identification information in the first database may be modified to the received identification information, or the received identification information may be added to the first database. Also, the identification information stored in the address list database may also be modified according to the modification of the identification information of the first database.

Figure 7:
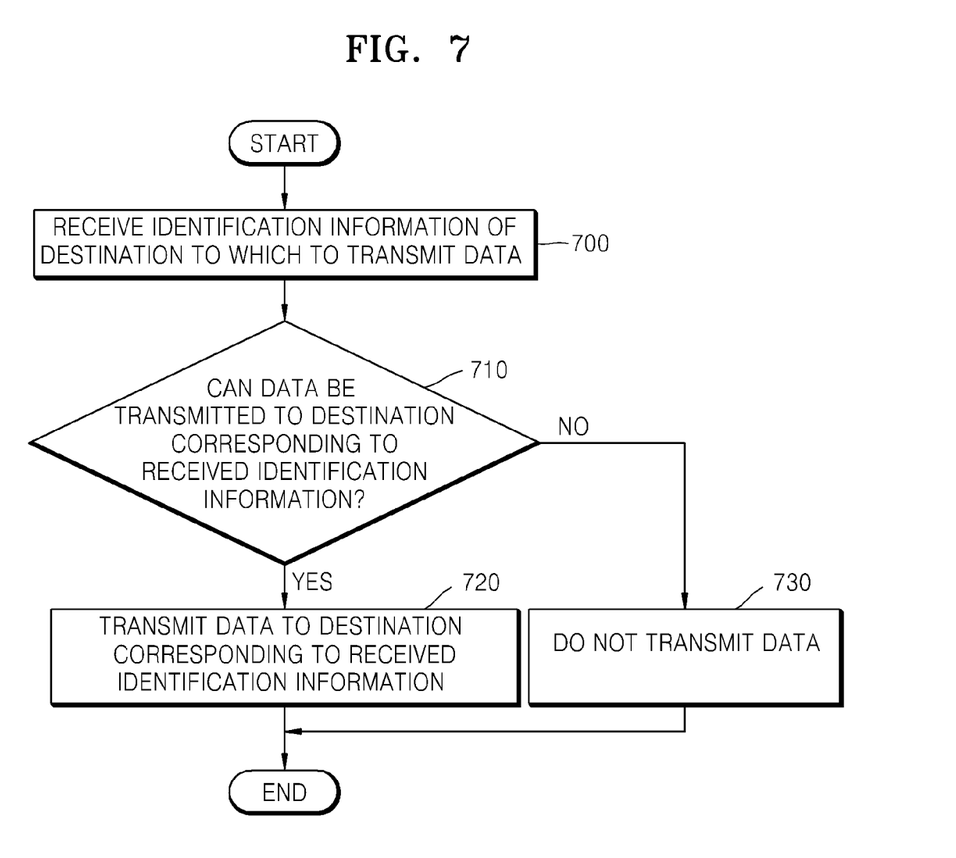
FIG. 7 is a flowchart illustrating a data transmission method conducted in an image forming apparatus according to another embodiment of the present general inventive concept.

FIG. 7 is a flowchart illustrating a data transmission method conducted in an image forming apparatus according to another embodiment of the present general inventive concept. Referring to FIG. 7, the identification information of a destination to where data is to be transmitted is received in operation 700. The identification information may be received via the user interface of FIG. 3. For example, when the destination to where data is to be transmitted is an FTP server, the IP address of the FTP server may be received via the user interface of FIG. 3.

Then, whether the destination corresponding to the received identification information is a destination to where data can be transmitted is determined based on the security policy of the image forming apparatus in operation 710. When the security policy of the image forming apparatus is the transmission-possible mode, and the received identification information exists in the first database, the destination corresponding to the received identification information is determined as a destination to where data can be transmitted. For example, when a server IP address of "10.90.194.55" is received via the user interface of FIG. 3, and the server IP address "10.90.194.55" is stored in the first database, the server having the IP address "10.90.194.55" is determined as a server to which data can be transmitted. On the other hand, when the received server IP address does not exist in the first database, the server corresponding to the server IP address is determined as a server to which data cannot be transmitted.

Conversely, when the security policy of the image forming apparatus is the transmission-block mode, and the received identification information does not exist in the second database, the destination corresponding to the received identification information is determined as a destination to which data can be transmitted. For example, when a server IP address of "10.90.194.55" is received via the user interface illustrated in FIG. 3 and the server IP address "10.90.194.55" is not stored in the second database, the server having the IP address "10.90.194.55" is determined as a server to which data can be transmitted. On the other hand, when the received server IP address exists in the second database, the server corresponding to the received server IP address is determined as a server to which data cannot be transmitted. When the server is determined as a destination to which data can be transmitted, the method proceeds to operation 720. However, when the server is determined as a destination to which data cannot be transmitted, the method proceeds to operation 730.

When the destination is determined to be a destination to where data can be transmitted (operation 710), data is transmitted to the destination corresponding to the received identification information in operation 720. For example, when the received identification information is an IP address, data is transmitted to a server corresponding to the IP address. The data may be scan data, or any other data stored in or generated by the image forming apparatus.

When the destination is determined to be a destination to where data cannot be transmitted (operation 710), data is not transmitted in operation 730. In this case, a message saying that data cannot be transmitted may be displayed.

Figure 8:
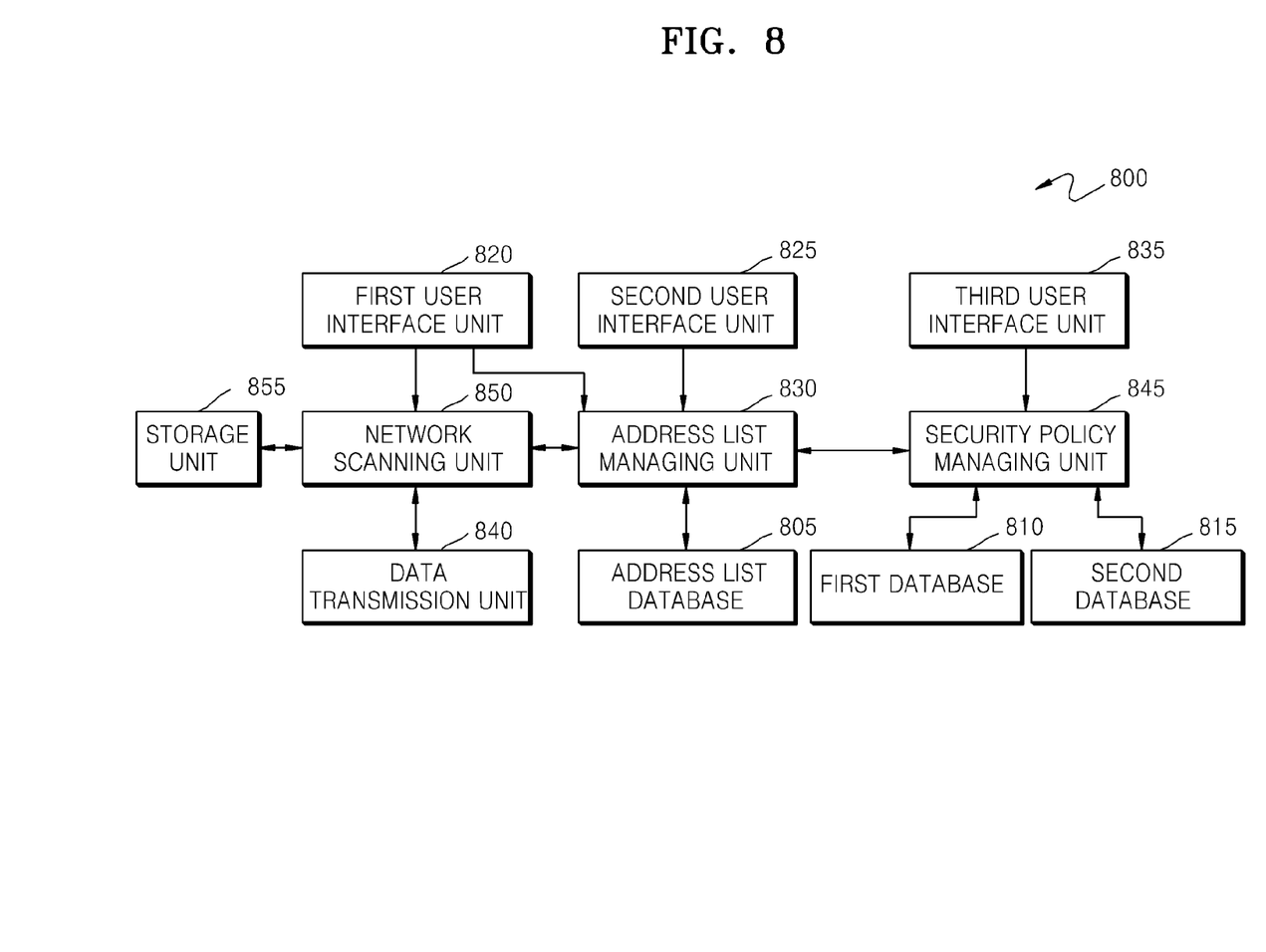
FIG. 8 is a block diagram illustrating an image forming apparatus transmitting data according to an embodiment of the present general inventive concept.

FIG. 8 is a block diagram illustrating an image forming apparatus 800 transmitting data according to an embodiment of the present general inventive concept. Referring to FIG. 8, the image forming apparatus 800 includes an address list database 805, a first database 810, a second database 815, a first user interface unit 820, a second user interface unit 825, an address list managing unit 830, a third user interface unit 835, a data transmission unit 840, a security policy managing unit 845, a network scanning unit 850, and a storage unit 855.

The address list database 805 stores identification information of destinations to where data can be transmitted (i.e., is allowed to be transmitted) based on the security policy of the image forming apparatus 800. That is, the image forming apparatus 800 transmits data using one or more security policies (for example, a transmission-possible mode, in which destinations that allow network access are designated, and a transmission-block mode, in which destinations that block network access are designated).

The first database 810 corresponds to the transmission-possible mode from the security policy of the image forming apparatus 800, and stores identification information of destinations to which data can be transmitted. For example, the first database 810 stores the IP address of a server to which data can be transmitted, the name of a device, the range of the server IP address, etc.

The second database 815 corresponds to the transmission-block mode from the security policy of the image forming apparatus 800, and stores identification information of destinations to which data cannot be transmitted. For example, the second database 815 stores the IP address of a server to which data cannot be transmitted, the name of a device, the range of the server IP address, etc.

The second user interface unit 825 receives identification information of predetermined destinations. In detail, identification information of predetermined destinations may be received via the user interface illustrated in FIG. 3. For example, when the destination is a server that is connected to the image forming apparatus 800 via a network, the IP address of the server is received.

The address list managing unit 830 compares identification information received through the second user interface unit 825 with identification information stored in the first database 810 and/or the second database 815, and stores the received identification information in the address list database 805 based on the comparison. In detail, when the security policy of the image forming apparatus is the transmission-possible mode, and the received identification information exists in the first database 810, the address list managing unit 830 stores the received identification information in the address list database 805. Similarly, when the security policy of the image forming apparatus is the transmission-block mode, and the received identification information does not exist in the second database 815, the address list managing unit 830 stores the input identification information in the address list database 805. Accordingly, when data is transmitted, identification information of the destinations where a security problem does not occur is stored in the address list database 805. However, it is understood that aspects of the present general inventive concept are not limited thereto. For example, according to other aspects, the address list database 805 stores identification information of the destinations where a security problem does occur.

The first user interface unit 820 receives identification information of a destination to where data is to be transmitted, from the identification information stored in the address list database 805. For example, when the destination is a server that is connected to the image forming apparatus 800 via a network, the IP address of the server is received.

The data transmission unit 840 transmits data to a destination corresponding to the identification information that is received through the first user interface unit 820. When the IP address of a server is input through the first user interface unit 820, the data transmission unit 840 transmits data to the server having the input IP address. As an example, the data transmission unit 840 transmits scan data generated by the network scanning unit 850 or data stored in the storage unit 855 to the server having the IP address that is received through the first user interface unit 820.

The third user interface unit 835 receives the security policy of the image forming apparatus 800 and identification information of a destination corresponding to the security policy. As an example, through the user interface illustrated in FIG. 6, the transmission-possible mode or the transmission-block mode is enabled, and identification information of a destination corresponding to the enabled security policy is received. That is, when the transmission-possible mode is enabled, the transmission-possible mode is selected, and when the transmission-block mode is enabled, the transmission-block mode is selected. The third user interface unit 835 may be realized in a local panel of the image forming apparatus 800 and/or in an embedded web server of the image forming apparatus 800.

The security policy managing unit 845 stores identification information in the first database 810 or in the second database 815 or modifies the stored identification information according to the security policy and the identification information that are received through the third user interface unit 835. For example, when the transmission-possible mode is received (or enabled) through the third user interface unit 835, and the received identification information is not stored in the first database 810, the security policy managing unit 845 stores the received identification information in the first database 810. On the other hand, when the transmission-block mode is received through the third user interface unit 835, and identification information different from the received identification information is stored in the second database 815, the identification information stored in the second database 815 is modified to the received identification information.

In the image forming apparatus 800 transmitting data according to the current embodiment, the first user interface unit 820, the second user interface unit 825, and the third user interface unit 835 are described as being different from one another. However, according to other embodiments, the first user interface unit 820, the second user interface unit 825, and/or the third user interface unit 835 may be realized as a single interface unit.

Figure 9:
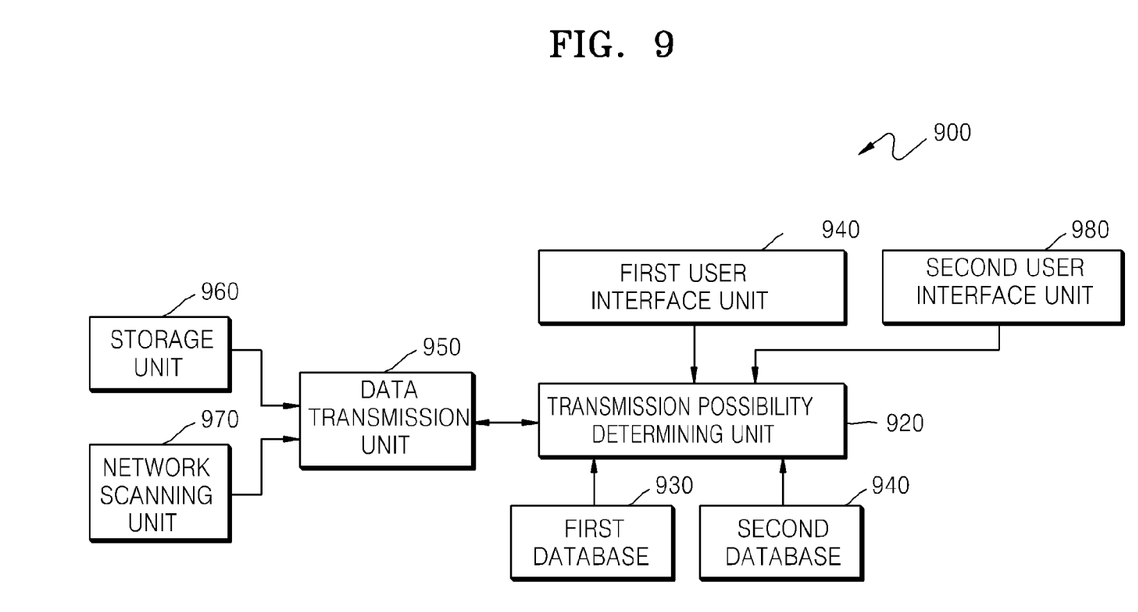
FIG. 9 is a block diagram illustrating an image forming apparatus transmitting data according to another embodiment of the present general inventive concept.

FIG. 9 is a block diagram illustrating an image forming apparatus 900 transmitting data according to another aspect of the present general inventive concept. Referring to FIG. 9, the image forming apparatus 900 includes a first user interface unit 910, a transmission possibility determining unit 920, a first database 930, a second database 940, a data transmission unit 950, a storage unit 960, a network scanning unit 970, and a second user interface unit 980.

The first user interface unit 910 receives identification information of at least one destination to where data is to be transmitted. The transmission possibility determining unit 920 determines whether data can be transmitted to a destination corresponding to the identification information received through the first user interface unit 910, based on the security policy of the image forming apparatus 900. The security policy of the image forming apparatus 900 may include a transmission-possible mode, in which destinations that allow network access are designated, and a transmission-block mode, in which destinations that block network access are designated. Thus, the transmission possibility determining unit 920 determines whether data can be transmitted according to whether the received identification information of the destination exists in a database corresponding to the security policy. The first database 930 corresponds to the transmission-possible mode from the security policy of the image forming apparatus 900, and stores identification information of destinations to which data can be transmitted. In contrast, the second database 940 corresponds to the transmission-block mode from the security policy of the image forming apparatus 900, and stores identification information of destinations to which data cannot be transmitted. In the current embodiment, the first database 930 and the second database 940 are separate. According to other embodiments, the first and second databases 930 and 940 may be realized as a single database.

In detail, when the security policy of the image forming apparatus 900 is the transmission-possible mode and identification information received through the first user interface unit 910 exists in the first database 930, the transmission possibility determining unit 920 determines the corresponding destination as a destination to where data can be transmitted. Similarly, when the security policy of the image forming apparatus is the transmission-block mode, and the identification information received through the first user interface unit 910 does not exist in the first database 930, the transmission possibility determining unit 920 determines the corresponding destination as a destination to where data can be transmitted.

The data transmission unit 950 transmits data to the destination that is determined as a destination to where data can be transmitted. The data transmission unit 950 may transmit data stored in the storage unit 960 or scan data generated by the network scanning unit 970.

The second user interface unit 980 receives the security policy of the image forming apparatus 900 and identification information of a destination corresponding to the security policy. Thus, when the security policy and the identification information of a destination corresponding to the security policy are received, identification information is stored in a database corresponding to the security policy, or is modified according to the received information.

While the image forming apparatus 900 transmitting data, the first user interface unit 910 and the second user interface unit 980 are described as separate in the current embodiment, it is understood that the first user interface unit 910 and the second user interface unit 980 may be realized as a single interface unit in other embodiments.

While not restricted thereto, aspects of the present general inventive concept can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present general inventive concept may also be realized as a data signal embodied in a carrier wave and comprising a program readable by a computer and transmittable over the Interne.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
a data transmission unit;
a user interface unit to receive information relating a user-selected destination where data is to be transmitted; and
a controller to determine whether the data is enabled to be transmitted to the user-selected destination received via the user interface unit based on a security policy of the image forming apparatus,
wherein security policy modes include a transmission-possible mode and a transmission-block mode,
wherein the controller determines whether to enable the data to be transmitted via the data transmission unit to the user-selected destination based on if the security policy is in the transmission-possible mode or the transmission-block mode and if the user-selected destination corresponds to one of a plurality of destination addresses associated with the security policy,
wherein if the security policy is in a transmission-possible mode, the security policy accesses a data base associated with the transmission-possible mode,
wherein if the security policy is in a transmission-block mode, the security policy accesses the data base associated with the transmission-block mode,
wherein, when the security policy is in the transmission-block mode, the controller enables the data to be transmitted to the user-selected destination if the user-selected destination does not correspond to any one of at least a subset of the destination addresses associated with the security policy, and
wherein the image forming apparatus performs printing and scanning operations.

2. The image forming apparatus of claim 1, wherein, when the security policy is in the transmission-possible mode, the controller enables the data to be transmitted via the data transmission unit to the user-selected destination if the user-selected destination corresponds to any one of at least a subset of the destination addresses associated with the security policy.

3. The image forming apparatus of claim 2, wherein the plurality of destination addresses associated with the security policy comprises a plurality of first destination addresses associated with the transmission-possible mode.

4. The image forming apparatus of claim 2, wherein, when the security policy is in the transmission-possible mode, the controller prohibits the data to be transmitted to the user-selected destination if the user-selected destination does not correspond to any one of the at least the subset of the destination addresses associated with the security policy.

5. The image forming apparatus of claim 4, wherein the at least the subset of the destination addresses associated with the security policy comprises a plurality of first destination addresses associated with the transmission-possible mode.

6. The image forming apparatus of claim 5, further comprising:
the database to store the plurality of first destination addresses associated with the transmission-possible mode.

7. The image forming apparatus of claim 6, wherein the controller is configured to receive information relating to a first destination address associated with the transmission-possible mode via the user interface unit and store the received first destination address in the database.

8. The image forming apparatus of claim 1, wherein the plurality of destination addresses associated with the security policy comprises a plurality of second destination addresses associated with the transmission-block mode.

9. The image forming apparatus of claim 1, wherein, when the security policy is in the transmission-block mode, the controller prohibits the data to be transmitted to the user-selected destination if the user-selected destination corresponds to any one of the at least the subset of the destination addresses associated with the security policy.

10. The image forming apparatus of claim 9, wherein the at least subset of destination addresses associated with the security policy comprises a plurality of second destination addresses associated with the transmission-block mode.

11. The image forming apparatus of claim 10, further comprising:
the database to store the plurality of second destination addresses associated with the transmission-block mode.

12. The image forming apparatus of claim 11, wherein the controller is configured to receive information relating to a second destination address associated with the transmission-block mode via the user interface unit and store the received second destination address in the database.

13. An image forming apparatus comprising:
a data transmission unit;
a user interface unit to receive information relating a user-selected destination where data is to be transmitted; and
a controller to determine whether the data is enabled to be transmitted to the user-selected destination received via the user interface unit based on a security policy of the image forming apparatus,
wherein security policy modes include a transmission-possible mode and a transmission-block mode,
wherein the controller determines whether to enable the data to be transmitted via the data transmission unit to the user-selected destination based on if the security policy is in the transmission-possible mode or the transmission-block mode and if the user-selected destination corresponds to one of a plurality of destination addresses associated with the security policy,
wherein if the security policy is in a transmission-possible mode, the security policy accesses a data base associated with the transmission-possible mode,
wherein if the security policy is in a transmission-block mode, the security policy accesses the data base associated with the transmission-block mode,
wherein, when the security policy is in the transmission-possible mode, the controller enables the data to be transmitted via the data transmission unit to the user-selected destination if the user-selected destination corresponds to any one of a plurality of first destination addresses associated with the transmission-possible mode,
wherein, when the security policy is in the transmission-block mode, the controller enables the data to be transmitted to the user-selected destination if the user-selected destination does not correspond to any one of a plurality of second destination addresses associated with the transmission-block mode, and
wherein the image forming apparatus performs printing and scanning operations.

14. The image forming apparatus of claim 13, further comprising
the database to store the plurality of first destination addresses associated with the transmission-possible mode and the plurality of second destination addresses associated with the transmission block mode.

15. The image forming apparatus of claim 14, wherein the controller is configured to receive information relating to a first destination address associated with the transmission-possible mode via the user interface unit and store the received first destination address in the database.

16. The image forming apparatus of claim 15, wherein the controller is configured to receive information relating to a second destination address associated with the transmission-block mode via the user interface unit and store the received second destination address in the database.

17. A method of transmitting data from an image forming apparatus, the method comprising:
receiving information relating to a user-selected destination where data is to be transmitted by way of a user interface; and
determining whether the data is enabled to be transmitted to the user-selected destination received by way of the user interface based on a security policy of the image forming apparatus,
wherein security policy modes include a transmission-possible mode and a transmission-block mode,
wherein the determination is based on whether the security policy is in the transmission-possible mode or the transmission-block mode and whether the user-selected destination corresponds to one of a plurality of destination addresses associated with the security policy,
wherein if the security policy is in a transmission-possible mode, the security policy accesses a data base associated with the transmission-possible mode,
wherein if the security policy is in a transmission-block mode, the security policy accesses the data base associated with the transmission-block mode,
wherein, when the security policy is in the transmission-possible mode, the data is transmitted to the user-selected destination if the user-selected destination corresponds to any one of a plurality of first destination addresses associated with the transmission-possible mode,
wherein, when the security policy is in the transmission-block mode, the data is transmitted to the user-selected destination if the user-selected destination does not correspond to any one of a plurality of second destination addresses associated with the transmission-block mode, and
wherein the image forming apparatus performs printing and scanning operations.

* * * * *